United States Patent
Buehlmann et al.

(10) Patent No.: US 7,660,146 B2
(45) Date of Patent: Feb. 9, 2010

(54) FERROELECTRIC RECORDING MEDIUM

(75) Inventors: Simon Buehlmann, Yongin-si (KR); Seung-bum Hong, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 175 days.

(21) Appl. No.: 11/494,505

(22) Filed: Jul. 28, 2006

(65) Prior Publication Data
US 2008/0102290 A1 May 1, 2008

(30) Foreign Application Priority Data
Jul. 28, 2005 (KR) .................. 10-2005-0069115

(51) Int. Cl.
*G11C 11/22* (2006.01)
(52) U.S. Cl. ............... 365/145; 257/295; 369/126; 977/947
(58) Field of Classification Search ............. 257/295, 257/E27.104; 365/145, 164; 369/126; 977/943, 977/947
See application file for complete search history.

(56) References Cited

U.S. PATENT DOCUMENTS

| 6,300,652 | B1 * | 10/2001 | Risch et al. ............. 257/296 |
| 6,683,803 | B2 * | 1/2004 | Gudesen et al. ......... 365/145 |
| 6,784,475 | B2 * | 8/2004 | Hong et al. ............. 257/295 |
| 6,819,588 | B2 * | 11/2004 | Baumeister et al. ..... 365/174 |

* cited by examiner

*Primary Examiner*—Tuan T Nguyen
*Assistant Examiner*—Alexander Sofocleous
(74) *Attorney, Agent, or Firm*—Sughrue Mion, PLLC

(57) ABSTRACT

Provided are a ferroelectric recording medium and a method of manufacturing the same. The ferroelectric recording medium includes a substrate, a plurality of supporting layers which are formed on the substrate, each of the supporting layers having at least two lateral surfaces; and data recording layers formed on the lateral surfaces of the supporting layers. First and second data recording layers may be respectively disposed on two facing lateral surfaces of each of the supporting layers. The supporting layers may be polygonal pillars having at least three lateral surfaces. A plurality of the supporting layers can be disposed at uniform intervals in a two-dimensional array.

7 Claims, 5 Drawing Sheets

FERROELECTRIC RECORDING MEDIUM

CROSS-REFERENCE TO RELATED PATENT APPLICATION

This application claims the benefit of Korean Patent Application No. 10-2005-0069115, filed on Jul. 28, 2005, in the Korean Intellectual Property Office, the disclosure of which is incorporated herein in its entirety by reference.

BACKGROUND OF THE INVENTION

1. Field of the Invention

The present invention relates to a data recording medium and method of manufacturing the same, and more particularly, to a ferroelectric recording medium and method of manufacturing the same.

2. Description of the Related Art

As internet technology develops, demand for recording media which can record a huge amount of information such as moving pictures, in particular, portable recording media, has increased. This demand is an important factor leading the next-generation information recording media market.

Recording media which can record a huge amount of information and devices for recording and reading information in the recording medium are the most essential issues for the information recording media market.

Portable, non-volatile data recording devices are classified into solid-state memory devices, for example, flash memory, and disk type memory devices, for example, hard disks.

Since the capacity of solid-state memory devices will only increase up to several gigabites (GB) in the next several years, solid-state memory devices may not be used as large data recording devices whose capacity must be greater than several gigabites in the near future. However, solid-state memory devices may be used for high speed apparatuses such as personal computers (PC). For the time being, hard disk type memory devices may be used as a main recording apparatus.

A typical magnetic hard disk mounted in a portable apparatus will have a capacity of 10 GB in the near future, but a capacity of more than 10 GB may not be accomplished due to a superparamagnetic effect.

A memory device using a scanning probe technique for recording data and using a ferroelectric material as a recording material has been developed. When using the scanning probe technique, i.e., a scanning probe microscope (SPM) technique, an area of several to tens of nanometers can be probed by a probe. In addition, since a ferroelectric material is used as a recording medium, a superparamagnetic effect will not occur, unlike in a magnetic recording medium. The recording density in the recording device using ferroelectric material can be greater than in the magnetic recording medium.

In the recording medium using an SPM technique, recorded data are defined by the polarity of the polarization of the ferroelectric material.

Due to ferroelectric polarization, an electric field is emanating from the surface. When an appropriate probe is placed into that field, the field induces a charge depletion or accumulation region at the apex of the tip. This in turn induces a capacitance or resistance change of the probe. Depending on the polarity of the ferroelectric polarization, the resistance or capacitance is increased or decreased. Data recorded on a ferroelectric recording medium using the SPM technique can be read by measuring the change in the capacitance or resistance of the probe. Writing is done by locally changing the ferroelectric polarization of the medium. This is done by applying an electric voltage to the probe, where the voltage is high enough to induce ferroelectric switching in the medium.

As described above, a ferroelectric recording medium using an SPM can have higher data recording density than a magnetic recording medium. However, it should be considered that the region of one bit data recording is a polarized area. In order to further increase a data recording density of a ferroelectric recording medium, the size of the bit data recording region in a ferroeletric recording medium should be reduced.

However, since the reduction in the size of the bit data recording region is very much dependent on the reduction of the probe size, a further increase of the data recording density of the ferroelectric recording medium will be difficult unless epoch-making technology for reducing the probe size is developed.

SUMMARY OF THE INVENTION

The present invention provides a ferroelectric recording medium with an increased data recording density.

The present invention also provides a method of manufacturing the ferroelectric recording medium having an increased data recording density.

According to an aspect of the present invention, there is provided a ferroelectric recording medium including: a substrate; a patterned supporting layer which is formed on the substrate, the patterns having at least two lateral surfaces; and data recording layers formed on the lateral surfaces of the patterns.

The data recording layers may include several data recording layers disposed on the lateral surfaces of the patterns of the supporting layer. The patterns of the supporting layer may have a polygonal shape having at least three lateral surfaces or may be a bar type.

A plurality of patterns may be formed on the substrate and disposed at uniform intervals.

The supporting layer may be formed of one or more selected from the group consisting of but not limited to titanium dioxide ($TiO_2$), vanadium dioxide ($VO_2$), niobium dioxide ($NbO_2$), zirconium dioxide ($ZrO_2$), oxides of iron, titanium nitride (TiN), vanadium nitride (VN), niobium nitride (NbN), zirconium nitride (ZrN), iron nitride ($Fe_2N$), strontium oxide (SrO), strontium nitride ($Sr_2N_3$), tantalum oxide ($Ta_2O_5$) and tantalum nitride ($Ta_2N$). The supporting layer may also be formed of one or more selected from the group consisting of titanium (Ti), vanadium (V), niobium (Nb), zirconium (Zr), iron (Fe), strontium (Sr) and tantalum (Ta).

The data recording layers may be formed of one selected from the group consisting of but not limited to lead zirconate titanate (PZT), strontium bismuth tantalate (SBT), strontium bismuth titanate (SBT) lithium titanate (LTO), lithium tantalate (LTO), strontium bismuth niobate (SBN), lead titanate (PTO), bismuth ferrite (BFO), bismuth titanate (BTO), and potassium niobate (KNO).

According to another aspect of the present invention, there is provided a method of manufacturing a ferroelectric recording medium, the method including: forming a supporting layer on a substrate; patterning the supporting layer into patterns having at least two lateral surfaces; forming source material layers on the lateral surfaces of the patterns; and diffusing a source material into the patterns of the supporting layer and reacting the source material with the material of the supporting layer. To trigger the reaction between the source material and the material of the supporting layer, and for diffusion, a temperature of 400° C. or more may be used.

The source material layers may be formed of a material that reacts with the material of the supporting layer to form a layer formed of one selected from the group consisting of but not limited to PZT, strontium bismuth tantalate (SBT), strontium bismuth titanate (SBT), lithium titanate (LTO), lithium tantalate (LTO), strontium bismuth niobate (SBN), PTO, BFO, BTO, and KNO on the lateral surfaces of the patterns. The basis for the source material may be, but is not limited to lead (Pb), potassium (K), bismuth (Bi), or lithium (Li).

According to another aspect of the present invention, there is provided a method of manufacturing a ferroelectric recording medium, the method including: forming a supporting layer on a substrate; forming a mask on the supporting layer to define a portion of the supporting layer; etching the supporting layer around the mask which produces patterns; placing the etched product in a gas atmosphere including a source material gas that reacts with the lateral surfaces of the patterns and diffuses into the pattern to form a ferroelectric lateral layer. To trigger the reaction between the source material and the material of the supporting layer, and for diffusion, a temperature of 400° C. or more may be used.

In the forming of the mask, the supporting layer may be defined into patterns of polygonal shapes having at least three lateral surfaces or may be a bar type.

The supporting layer may be formed of one or more selected from the group consisting of but not limited to $TiO_2$, $VO_2$, $NbO_2$, $ZrO_2$, oxides of iron, TiN, VN, NbN, ZrN, $Fe_2N$, SrO, $Sr_2N_3$, $Ta_2O_5$ and $Ta_2N$. The supporting layer may also be formed of one or more selected from the group consisting of but not limited to Ti, V, Nb, Zr, Fe, Sr and Ta.

The source material gas may be a material gas that reacts with the supporting layer to form a layer formed of one selected from the group consisting of but not limited to PZT, strontium bismuth tantalate (SBT), strontium bismuth titanate (SBT), lithium titanate (LTO), lithium tantalate (LTO), SBN, PTO, BFO, BTO, and KNO on the lateral surfaces of the supporting layer. The basis for the source material gas may be, but is not limited to Pb, K, Bi, or Li.

To trigger the reaction between source material and the material of the supporting layer, and for diffusion the fabrication may be performed at 400° C. or more. At the end, a final heat treatment using for example a rapid thermal annealing (RTA) process may be applied.

The ferroelectric recording medium has a high data recording density and offers high speed data recording and reading capabilities.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Figure 1:
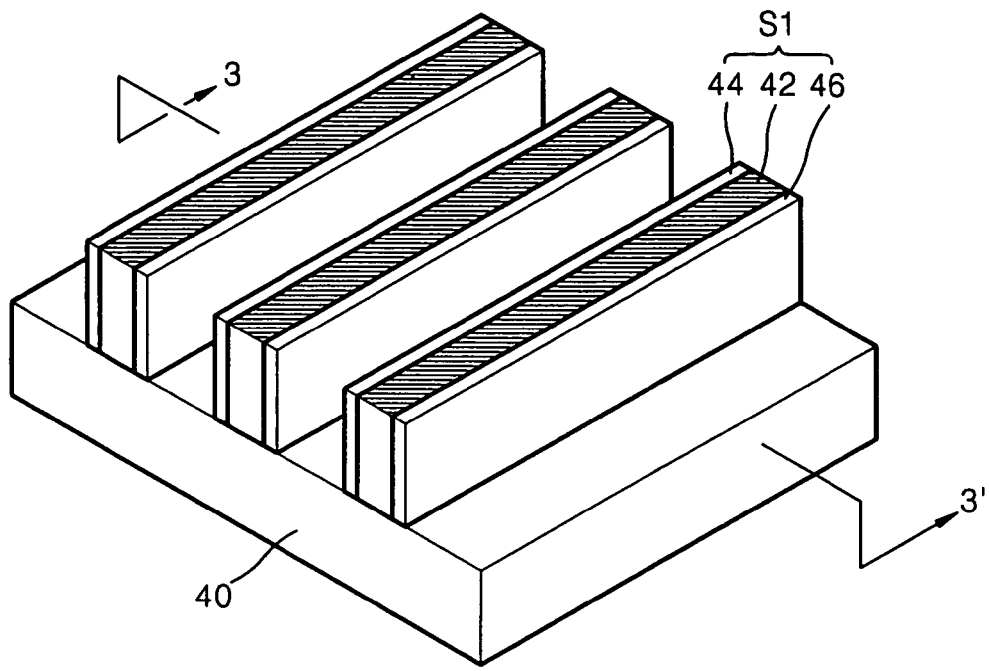
FIG. 1 is a perspective view of a ferroelectric recording medium according to a first exemplary embodiment of the present invention.

Hereinafter, the present invention will be described more fully with reference to the accompanying drawings, in which exemplary embodiments of the present invention are shown. In the drawings, the sizes and thicknesses of layers and regions are exaggerated for clarity.

A ferroelectric recording medium according to a first exemplary embodiment of the present invention (hereinafter, referred to as a first recording medium) is explained.

Referring to FIG. 1, the first recording medium includes bar type data recording units S1 in which data is recorded and which is formed on a substrate 40. The substrate 40 is used as a lower electrode. The substrate 40 is formed of a predetermined metal, for example, platinum (Pt) or iridium (Ir). Each of the data recording units S1 may include a supporting layer 42, and first and second recording layers 44 and 46. The supporting layer 42 supports the first and second recording layers 44 and 46. Both lateral surfaces of the supporting layer 42 are vertical. The first recording layer 44 covers one side of the supporting layer 42 and the second recording layer 46 covers another side of the supporting layer 42.

In FIG. 1, the first and second recording layers 44 and 46 appear that they are formed on both the lateral surfaces of the supporting layer 42 or that they are adhered to the both lateral surfaces of the supporting layer 42. However, considering a method of manufacturing the data recording unit S1 described below, the first and second recording layers 44 and 46 are formed by diffusing a source material into both the lateral surfaces of the supporting layer 42. Therefore, the first and second recording layers 44 and 46 are disposed in a predetermined depth inward from the lateral surfaces of the supporting layer 42. The supporting layer 42 is formed of $TiO_2$ or one or more selected from the group consisting of but not limited to $TiO_2$, $VO_2$, $NbO_2$, $ZrO_2$, oxides of iron, TiN, VN, NbN, ZrN, $Fe_2N$, SrO, $Sr_2N_3$, $Ta_2O_5$ and $Ta_2N$.

Alternatively, the supporting layer 42 may be formed of a pure metal. The pure metal may be one or more metals selected from the group consisting of Ti, V, Nb, Zr, Fe, Sr and Ta. The first and second recording layers 44 and 46 may be ferroelectric layers. For example, each of the first and second recording layers 44 and 46 may be formed of one selected from the group consisting of but not limited to PZT, strontium bismuth tantalate (SBT), strontium bismuth titanate (SBT), lithium titanate (LTO), lithium tantalate (LTO), SBN, PTO, BFO, BTO, and KNO. Like this, the first and second recording layers 44 and 46 are ferroelectric layers.

The polarization of the first and second recording layers 44 and 46 is initially aligned in a certain direction. The polarization of the first and second recording layers 44 and 46 is maintained in the initially aligned direction until an external predetermined voltage, which can change the polarization, is applied thereto. The polarization in certain areas of the first and second recording layers 44 and 46, which may be upward or downward, indicates that a bit of data is recorded in the certain area of the first and second recording layers 44 and 46.

Accordingly, data recorded on the first and second recording layers 44 and 46 is maintained until a voltage is applied to the first and second recording layers 44 and 46 to change data. A plurality of data recording units S1 are disposed on the substrate 40. The data recording units S1 are disposed parallel to each other and are separated from each other by predetermined intervals.

Figure 2:
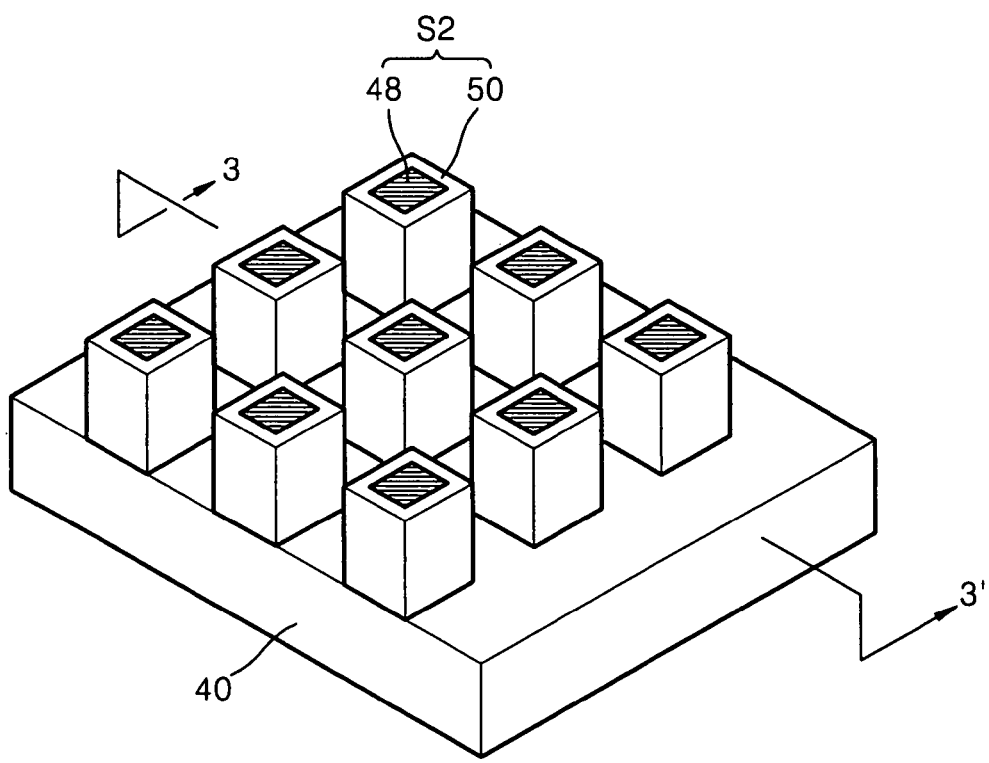
FIG. 2 is a perspective view of a ferroelectric recording medium according to a second exemplary embodiment of the present invention.

Next, a ferroelectric recording medium according to a second exemplary embodiment of the present invention (hereinafter, referred to as a second recording medium) is explained. Referring to FIG. 2, the second recording medium includes data recording units S2, in which data is stored, on a substrate 40. The data recording unit S2 is similar to the data recording unit S1 of the first recording medium of FIG. 1, but the structures are different.

Each of the data recording units S2 may include a supporting layer 48 and a recording layer 50. The supporting layer 48 may be composed of the same material as the supporting layer 42 of the first recording medium of FIG. 1 and the recording layer 50 may be composed of the same material as the first or second recording layer 44 or 46 of the first recording medium of FIG. 1. However, the supporting layer 48 has a polygonal structure, for example, a square pillar or a pillar comprising three lateral surfaces, and the recording layer 50 covers four lateral surfaces of the supporting layer 48. The relationship between the supporting layer 48 and the recording layer 50 may be the same as the relationship between the supporting layer 42 and the first and second recording layers 44 and 46 of the first recording medium of FIG. 1.

Since the recording layer 50 covers the four lateral surfaces of the supporting layer 48 of the second recording medium of FIG. 2, the recording layer 50 can be divided into four portions corresponding to the four lateral surfaces of the supporting layer 48. Bit data is independently recorded on each lateral surface of the recording layers 50. Accordingly, the first recording medium of FIG. 1 can record 2-bit data in the data recording unit S1, but the second recording medium of FIG. 2 can record 4-bit data in the data recording unit S2. A plurality of the data recording units S2 are disposed on the substrate 40 of the second recording medium of FIG. 2, and the data recording units S2 are separated from each other by equal intervals in the four directions.

According to the first and second recording media illustrated in FIGS. 1 and 2, a ferroelectric recording medium of an exemplary embodiment of the present invention may be modified in various ways. For example, the supporting layer in the ferroelectric recording medium according to an exemplary embodiment of the present invention may be a pentagonal, a hexagonal or even a circular pillar instead of the square pillar illustrated in FIG. 2.

Figure 3:
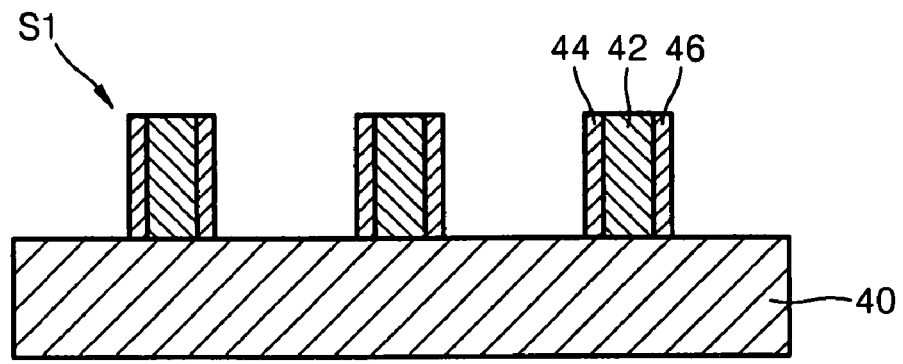
FIG. 3 is a cross-sectional view of the ferroelectric recording medium taken along the line 3-3' of FIG. 1 or 2.

FIG. 3 is a cross-sectional view of the first recording medium taken along the line 3-3' of FIG. 1 or the second recording medium taken along the line 3-3' of FIG. 2. The resultant structure shown in FIG. 3 may be formed by the methods described below.

First, a method of manufacturing a ferroelectric recording medium according to a first exemplary embodiment of the present invention (hereinafter, referred to as a first manufacturing method) is explained with reference to FIGS. 4 through 8.

Figure 4:
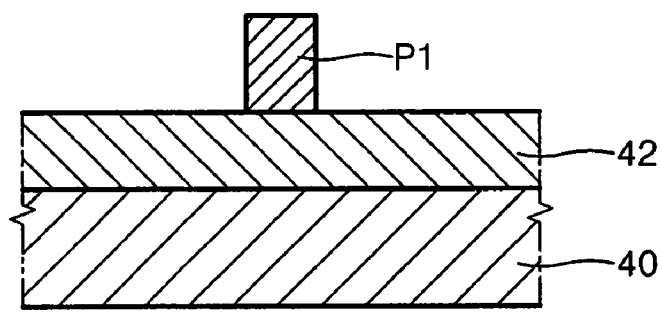
FIGS. 4 through 8 are cross-sectional views illustrating steps in a method of manufacturing a ferroelectric recording medium according to a first exemplary embodiment of the present invention.

Referring to FIG. 4, a supporting layer 42 is formed on a substrate 40. The substrate 40 is used as a lower electrode. The substrate 40 may be formed of a predetermined metal, for example, platinum (Pt) or iridium (Ir). The supporting layer 42 is used to support recording layers. The supporting layer 42 may be formed by depositing $TiO_2$ on the substrate 40. Alternatively, the supporting layer 42 may be formed of one or more selected from the group consisting but not limited to $TiO_2$, $VO_2$, $NbO_2$, $ZrO_2$, oxides of iron, TiN, VN, NbN, ZrN, $Fe_2N$, SrO, $Sr_2N_3$, $Ta_2O_5$ and $Ta_2N$. The supporting layer 42 may also be formed of one or more selected from the group consisting of Ti, V, Nb, Zr, Fe, Sr and Ta.

The supporting layer 42 may be formed on the substrate 40. After forming the supporting layer 42, a mask P1 defining a predetermined region of the supporting layer 42 is formed on the supporting layer 42. The mask P1 may be a photosensitive layer pattern.

Figure 5:
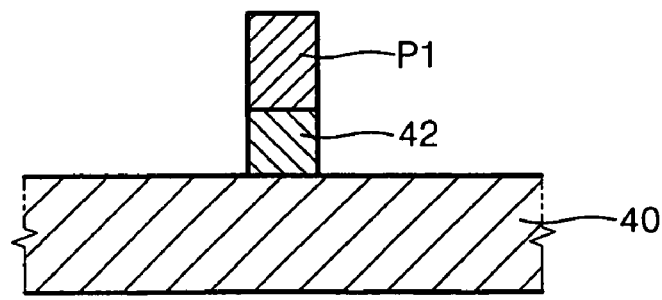

Referring to FIG. 5, the supporting layer 42 is etched until the upper surface of the substrate 40 is exposed. Through the etching process, the portion of the supporting layer 42 not disposed under the mask P1 is removed.

Figure 6:
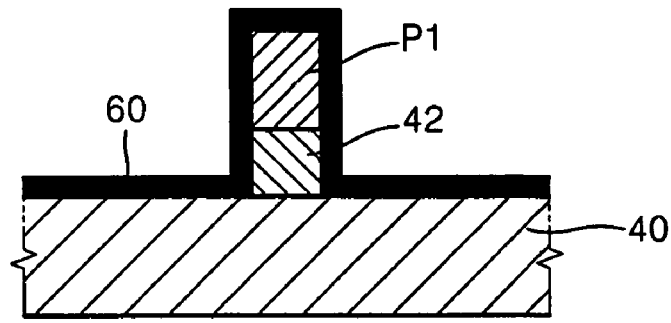

Next, referring to FIG. 6, a source material layer 60 is formed to cover exposed surfaces of the supporting layer 42 on the substrate 40. The source material layer 60 can react with the supporting layer 42 during an annealing process to form a ferroelectric layer. For example, when the supporting layer 42 is a $TiO_2$ layer, the source material layer 60 may be a lead oxide layer. The source material layer 60 may cover the whole surface of the mask P1.

Figure 7:
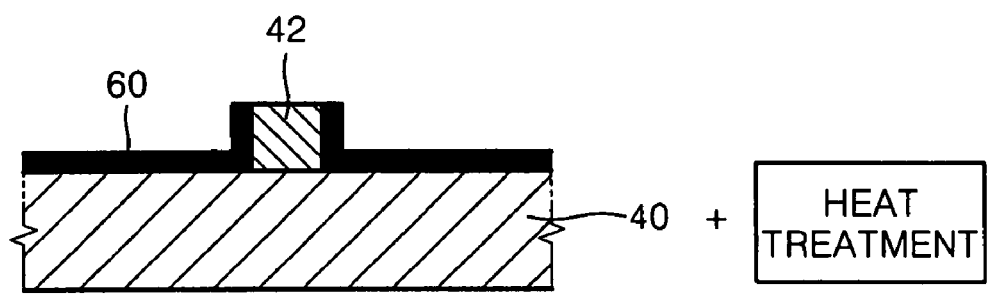

After forming the source material layer 60, the mask P1 is removed. The portion of the source material layer 60 formed on the surface of the mask P1 is removed together with the mask P1 in this process. Thus, as shown in FIG. 7, the source material layer 60 is left on the top surface of the substrate 40 and the lateral surfaces of the supporting layer 42, and the top surface of the supporting layer 42 is exposed. After the mask P1 is removed, heat treatment for the resultant structure from which the mask P1 is removed is performed at predetermined temperature ranges. For example, when a rapid thermal annealing (RTA) process is performed, the temperature range may be 400 to 1400° C. or, in an exemplary embodiment, 500° C. or more.

Figure 8:
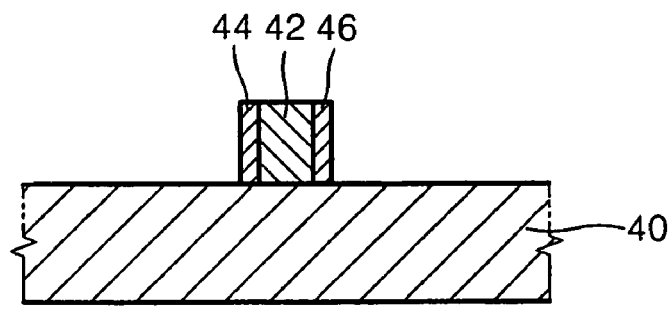

During the annealing process, the source material layer 60 formed on the substrate 40 is removed through evaporation, and the source material layer 60 formed on the lateral surfaces of the supporting layer 42 diffuses into and reacts with the supporting layer 42. Therefore, first and second recording layers 44 and 46 are formed on the lateral surfaces of the supporting layer 42, as illustrated in FIG. 8. For example, each of the first and second recording layers 44 and 46 may be formed of one selected from the group consisting of but not limited to PZT, strontium bismuth tantalate (SBT), strontium bismuth titanate (SBT), lithium titanate (LTO), lithium tantalate (LTO), SBN, PTO, BFO, BTO, and KNO.

Bit data is recorded in the first and second recording layers 44 and 46. The diffusion rate of the source material layer 60 is controlled by controlling heat treatment conditions such as heat treatment time or heat treatment temperature. Therefore, the widths of the first and second recording layers 44 and 46 are also controlled by controlling the heat treatment conditions. Consequently, the width of a bit data recording region can be controlled by control of the heat treatment conditions and by the thickness of the source material layer.

Next, a method of manufacturing a ferroelectric recording medium according to a second exemplary embodiment of the present invention (hereinafter, referred to as a second manufacturing method) is explained with reference to FIGS. 9 and 10.

Figure 9:
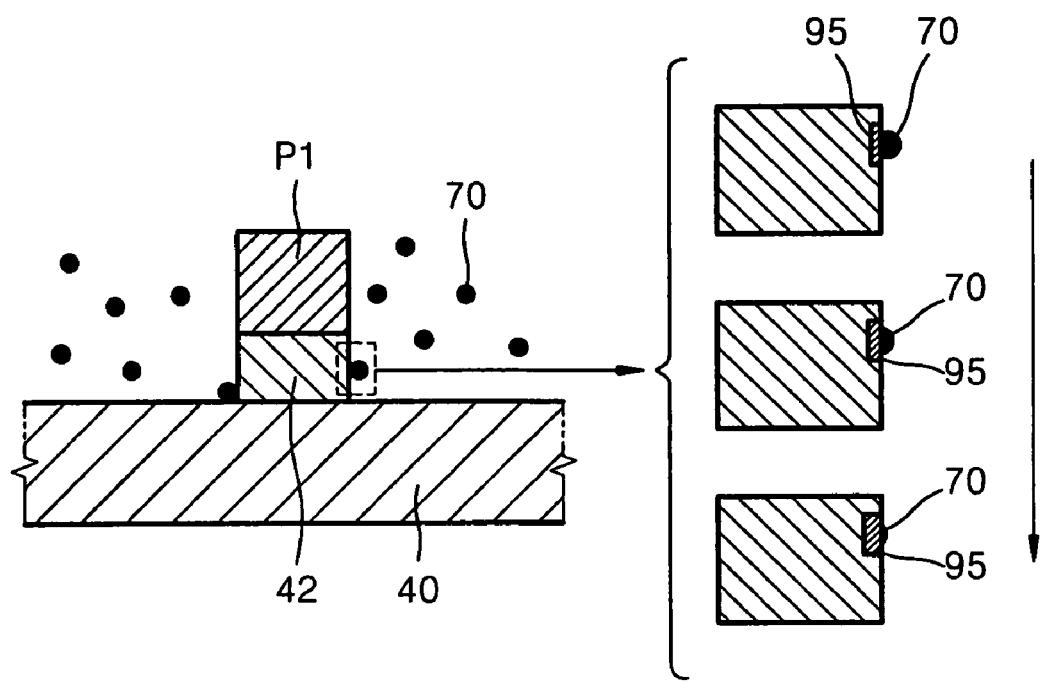
FIGS. 9 and 10 are cross-sectional views illustrating steps in a method of manufacturing a ferroelectric recording medium according to a second exemplary embodiment of the present invention.

Referring to FIG. 9, the mask P1 is formed according to the first manufacturing method. After forming the mask P1, the product is placed in a gas atmosphere including a source material gas 70. The source material gas 70 may be a material gas which can react with the supporting layer 42 to form a ferroelectric layer. For example, when the supporting layer 42 is formed of TiO$_2$, the source material gas 70 may be PbO gas. While the supporting layer 42 is placed in the source material gas 70, the lateral surfaces of the supporting layer 42 contact the source material gas 70. While the temperature is above a certain value, for example 400 C, reaction of the source material with the supporting material occurs and diffusion into the supporting material takes place.

Referring to the mentioned example, if the source material gas is PbO and the supporting material is TiO$_2$, lead titanium oxide (PbTiO$_3$) may be formed in that way. The heating may be obtained in the same way as the above-described heat treatment in the first manufacturing method. During the heat treatment, the source material gas 70 contacting the lateral surfaces of the supporting layer 42, diffuses into and reacts with the supporting layer 42 as shown on the right of FIG. 9. Consequently, a ferroelectric layer 95 is formed inward from the lateral surfaces of the supporting layer 42. In this exemplary embodiment, the mask P1 should be resistant to the temperature used in this manufacturing process.

Figure 10:
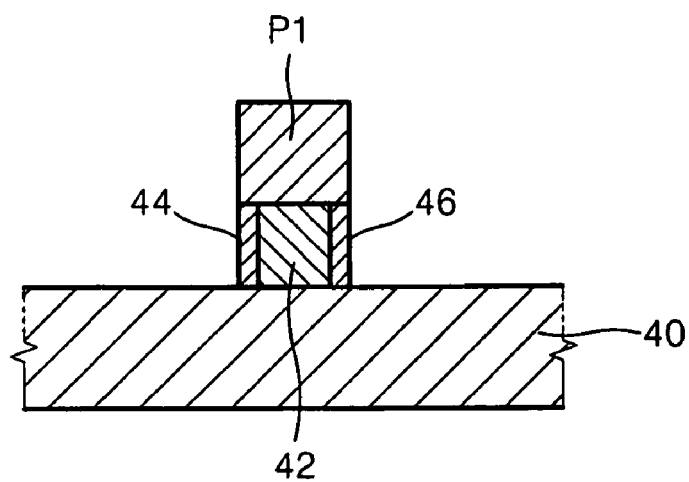

Referring to FIG. 10, the first and second recording layers 44 and 46 formed of the ferroelectric material are thus formed on the lateral surfaces of the supporting layers 42 through the heat treatment. The mask P1 is removed after the heat treatment.

Figure 11:
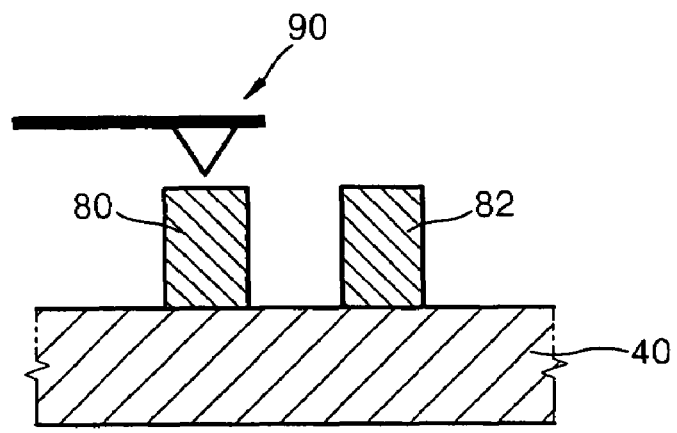
FIG. 11 is a cross-sectional view illustrating access by a probe in a conventional recording medium.
Figure 12:
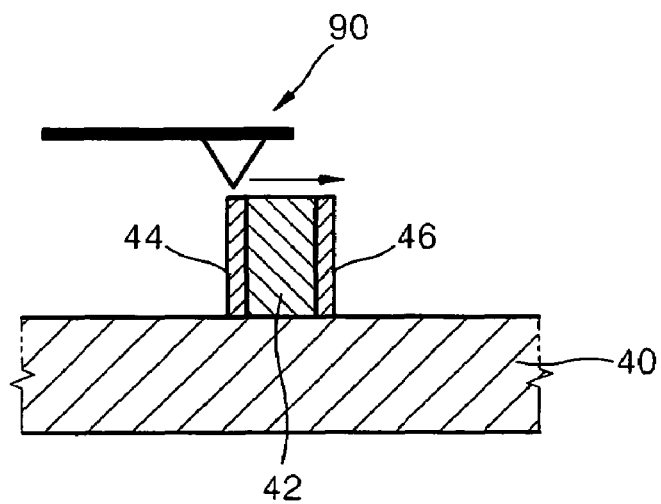
FIG. 12 is a cross-sectional view illustrating access by a probe in a recording medium according to an exemplary embodiment of the present invention.

The difference in operating speeds of a conventional recording medium and a recording medium according to an exemplary embodiment of the present invention will now be described. FIG. 11 is a cross-sectional view illustrating access by a probe in a conventional recording medium. FIG. 12 is a cross-sectional view illustrating access by a probe in a recording medium according to an exemplary embodiment of the present invention.

In the case of a conventional recording medium as illustrated in FIG. 11, a case when a probe 90 accesses first and second recording layers 80 and 82 will be considered. The probe 90 searches for and accesses the first recording layer 80, and then a predetermined operation is performed. Subsequently, the probe 90 searches for the second recording layer 82 in order to access the second recording layer 82. That is, the probe 90 should search for each recording layer one by one in order to access it. However, in the case of a recording medium according to an exemplary embodiment of the present invention, at least the two recording layers 44 and 46 are disposed on opposite surfaces of the supporting layer 42.

Accordingly, when the probe 90 accesses the recording layer 44 of the two recording layers 44 and 46, the probe 90 can access the recording layer 46 by only moving across the upper surface of the supporting layer 42. That is, it is unnecessary to search for the subsequent recording layer when the probe 90 has already accessed one of two adjacent recording layers which are opposite to each other and where the supporting layer 42 exists between the two recording layers 44 and 46. Therefore, the ferroelectric recording medium according to an exemplary embodiment of the present invention can read and record data faster than the conventional recording medium.

When a portion of the source material layer 60 remains on the lateral surfaces of the supporting layer 42 after the heat treatment process in the first method, the residual portion of the source material layer 60 may be removed. The heat treatment may be performed using various heat treatment apparatuses. In addition, the data recording layer may be formed of other ferroelectric materials which are not described above.

As described above, the ferroelectric recording unit according to the exemplary embodiments of the present invention includes a supporting layer and at least two data recording layers formed on the lateral surfaces of the supporting layer. Bit data is independently recorded in the data recording layers. The data recording density of ferroelectric recording medium according to the present invention is increased by a factor corresponding to the number of lateral recording layers.

In addition, since two data recording layers are formed on opposite sides of a supporting layer in the ferroelectric recording medium according to the exemplary embodiments of the present invention, when a probe accesses a selected one of the two data recording layers, searching for the other data recording layer is not necessary because the location of the other data recording layer is exactly defined from the selected one. That is, in the recording medium of the present invention, the probe can access two data recording layers by searching for only one of the data recording layers. Therefore, the ferroelectric recording medium according to the exemplary embodiments of the present invention has a high operating speed for recording and reading data.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A ferroelectric recording medium using an scanning probe microscope (SPM), the ferroelectric recording medium comprising:
   a substrate;
   a supporting layer which is formed on the substrate, wherein the supporting layer comprises at least two lateral surfaces; and
   a plurality of data recording layers which are formed on the at least two lateral surfaces of the supporting layer and are capable of independently recording bit data relative to one another by being accessed by a probe provided in the SPM.

2. The medium of claim 1, wherein the plurality of data recording layers comprises a first data recording layer and a second data recording layer disposed on two facing lateral surfaces of the supporting layer, respectively.

3. The medium of claim 1, wherein the supporting layer comprises a polygonal pillar comprising at least four lateral surfaces.

4. The medium of claim 3, wherein a plurality of supporting layers are formed on the substrate and are disposed at uniform intervals in a two-dimensional array along the substrate.

5. The medium of claim 1, wherein the supporting layer is formed of one of titanium dioxide (TiO2), vanadium dioxide (VO2), niobium dioxide (NbO2), zirconium dioxide (ZrO2), oxides of iron, titanium nitride (TiN), vanadium nitride (VN), niobium nitride (NbN), zirconium nitride (ZrN), and iron nitride (Fe2N).

6. The medium of claim 1, wherein the supporting layer is formed of one of titanium (Ti), vanadium (V), niobium (Nb), zirconium (Zr), and iron (Fe).

7. The medium of claim 1, wherein the plurality of data recording layers are formed of one of lead zirconate titanate (PZT), barium strontium titanate (BST), strontium bismuth tantalum (SBT), polarized lead zirconium titanate (PLZT), PTO, BFO, strontium titanate oxide (STO), barium titanyl oxalate (BTO), TNO, TWO, and KNO.

* * * * *